(12) United States Patent
Mandelkau (10) Patent No.: US 10,818,161 B2
(45) Date of Patent: Oct. 27, 2020

(54) METHOD FOR THE IMPLEMENTATION AND/OR MAINTENANCE OF A CENTRAL FIRE ALARM SYSTEM AND/OR FIRE EXTINGUISHING CONTROL CENTER AND DEVICE THEREFORE

(71) Applicant: MINIMAX GMBH & CO. KG, Bad Oldesloe (DE)

(72) Inventor: Detlef Mandelkau, Bad Schwartau (DE)

(73) Assignee: Minimax GmbH & Co. KG, Bad Oldesloe (DE)

( * ) Notice: Subject to any disclaimer, the term of this patent is extended or adjusted under 35 U.S.C. 154(b) by 0 days.

(21) Appl. No.: 16/340,369

(22) PCT Filed: Oct. 18, 2017

(86) PCT No.: PCT/EP2017/076559
§ 371 (c)(1),
(2) Date: Apr. 8, 2019

(87) PCT Pub. No.: WO2018/073284
PCT Pub. Date: Apr. 26, 2018

(65) Prior Publication Data
US 2020/0051421 A1    Feb. 13, 2020

(30) Foreign Application Priority Data

Oct. 21, 2016  (DE) .................... 10 2016 120 081

(51) Int. Cl.
*G08B 25/04*    (2006.01)
*G06F 16/245*   (2019.01)
*G08B 17/00*    (2006.01)

(52) U.S. Cl.
CPC ......... *G08B 25/045* (2013.01); *G06F 16/245* (2019.01); *G08B 17/00* (2013.01)

(58) Field of Classification Search
CPC ...... G08B 25/045; G08B 17/00; G06F 16/245
(Continued)

(56) References Cited

U.S. PATENT DOCUMENTS 6,313,744 B1   11/2001  Capowski et al.
7,167,088 B2    1/2007  Farley
(Continued)

FOREIGN PATENT DOCUMENTS

CN       2634628 Y     8/2004
CN     101053262 A    10/2007
(Continued)

OTHER PUBLICATIONS

International Searching Authority, International Search Report in German & English translation in International Appln. No. PCT/EP2017/076559, dated May 4, 2018, 9 pages.
(Continued)

*Primary Examiner* — John A Tweel, Jr.
(74) *Attorney, Agent, or Firm* — Perkins Coie LLP (57) ABSTRACT

The invention relates to a method for assisting with the commissioning and/or maintenance of a fire alarm and/or extinguishing control center (12) comprising a central control unit (30), a plurality of functional modules (14a-14g) and at least one data interface (36). A display unit (40) is connected to the central control unit (30) by means of the data interface (36), and an information mode which can be activated and deactivated is respectively assigned to each of the functional modules (14a-14g). Information is respectively stored for each of the functional modules (14a-14g), wherein, by activating the information mode of a functional module (14a-14g), the stored information relating to that functional module (14a-14g) whose information mode has been activated is displayed using the display unit (40) or
(Continued)

tablet computer (44). The invention also relates to a system for carrying out the method and to a functional module.

19 Claims, 3 Drawing Sheets

(58) Field of Classification Search
USPC .......................................................... 340/514
See application file for complete search history.

(56) References Cited

U.S. PATENT DOCUMENTS

| | | | |
|---|---|---|---|
| 2002/0180598 A1* | 12/2002 | Pfefferseder | G08B 25/04 340/500 |
| 2008/0084291 A1 | 4/2008 | Campion et al. | |
| 2012/0068842 A1* | 3/2012 | Piccolo, III | G08B 25/14 340/501 |
| 2012/0120070 A1* | 5/2012 | Baillot | G08B 25/14 345/419 |
| 2014/0009279 A1 | 1/2014 | Tsubokawa et al. | |
| 2014/0266676 A1 | 9/2014 | Piccolo, III et al. | |
| 2014/0375449 A1 | 12/2014 | Piccolo, III et al. | |
| 2016/0012639 A1* | 1/2016 | Park | G06F 16/5866 345/633 |

FOREIGN PATENT DOCUMENTS

| | | |
|---|---|---|
| CN | 101841426 A | 9/2010 |
| CN | 202025413 U | 11/2011 |
| CN | 203179211 U | 9/2013 |
| CN | 104008463 A | 8/2014 |
| DE | 29817784 U1 * | 1/1999 |
| EP | 1 296 301 A2 | 3/2003 |
| EP | 2 975 586 A1 | 1/2016 |
| EP | 975586 A1 * | 1/2016 |
| JP | H09-190588 | 7/1997 |

OTHER PUBLICATIONS

Written Opinion (with English translation), International Application No. PCT/EP2017/076559 (published under WO 2018/073284), dated May 4, 2018 (19 pages).
Search Report (in German), German Application No. 10 2016 120 081.6, 7 pages (dated Jun. 28, 2017).
Office Action (with English translation), Chinese Application No. 201780065215.3, 44 pages (dated Jul. 9, 2020).

* cited by examiner

METHOD FOR THE IMPLEMENTATION AND/OR MAINTENANCE OF A CENTRAL FIRE ALARM SYSTEM AND/OR FIRE EXTINGUISHING CONTROL CENTER AND DEVICE THEREFORE

PRIORITY CLAIM AND INCORPORATION BY REFERENCE

This application is a 35 U.S.C. § 371 application of International Application No. PCT/EP2017/076559, filed Oct. 18, 2017, which claims the benefit of German Application No. 10 2016 120 081.6 filed Oct. 21, 2016, each of which is incorporated by reference in its entirety.

TECHNICAL FIELD

The invention relates to a method and a corresponding system for commissioning and/or maintaining a fire alarm and/or extinguishing control center by means of a display and operating unit.

BACKGROUND AND SUMMARY OF THE INVENTION

According to the prior art, fire alarm systems have participants, for example fire alarms, which are connected to a fire alarm control center of the fire alarm system. After a participant has been addressed or triggered on account of an event, for example a detected fire, the event messages are therefore transmitted from the corresponding participant to the fire alarm control center by means of the electrical lines.

The fire alarm control center which usually has a modular structure also has a multiplicity of modules which are also referred to as functional modules. These functional modules have connections to which the electrical lines of the participants are connected. In this case, not every participant can be connected to any desired functional module, but rather a particular connection or one of a plurality of particular connections of a predetermined functional module must be selected for the connection on the basis of the installation location of the participant and the function or type of participant.

If a participant detects an event and transmits this to the fire alarm and/or extinguishing control center via the electrical line and the functional module, participants such as actuators of an extinguishing device are controlled in response to this event. These actuators are, for example, valves for opening extinguishing fluid lines. These participants, such as actuators, are also connected to functional modules of the extinguishing control center via electrical lines.

In the case of large buildings or industrial plants, the number of participants is very high and may exceed a number of several thousand participants, for example. In the case of such objects, the number of functional modules is also in a range of up to 100 functional modules, for example.

In the object to be protected, the participants are already arranged at their position predetermined according to the planning and the electrical lines are laid to a location at which the fire alarm and/or extinguishing control center is arranged.

In order to commission the fire alarm and/or extinguishing control center, the task is then to connect all incoming electrical lines of the participants, which are signal lines and/or energy transmission lines for example, to the corresponding functional modules of the fire alarm and/or extinguishing control center. In this case, it must be ensured that each of the electrical lines is connected exactly to that connection of a functional module at which the project planner envisaged this.

The practice of connecting the electrical lines of the participants to the corresponding connections of the functional modules is therefore very susceptible to errors and must be carried out with the utmost care, for example by means of circuit diagrams. Despite being careful, errors often still occur and must be subsequently found and eliminated during a functional check. The installation and/or commissioning of a fire alarm and/or extinguishing control center is/are therefore very time-consuming and susceptible to errors. In addition, there is no guarantee that the planning documents correspond to the actual configuration in the fire alarm and/or extinguishing control center.

The object of the present invention is therefore to find a method and a system for addressing commissioning and maintenance of a fire alarm and/or extinguishing control center with regard to the problems mentioned above. In particular, the intention is to propose a possibility for simplifying the commissioning and maintenance and for reducing errors during the commissioning of fire alarm and/or extinguishing control centers. The intention is at least to propose an alternative solution to the prior art.

One aspect provides a method for commissioning and/or maintaining a fire alarm and/or extinguishing control center by means of a display and operating unit, wherein the fire alarm and/or extinguishing control center has a central control unit and a plurality of functional modules connected to the central control unit, wherein the display and operating unit is connected or can be connected to the central control unit, wherein each of the functional modules has a plurality of connections for connecting participants, in particular fire alarms, signal generators and/or actuators, and an interaction unit for interacting with an operator, wherein the method is adapted in such a manner that the display and operating unit displays functional module data belonging to one of the functional modules, wherein the display of the functional module data depends on an interaction of the interaction unit of the functional module and/or the interaction of the interaction unit of the functional module depends on the display of the functional module data.

In accordance with the method according to the invention, a content-related connection of the display and operating unit to that functional module to which the interaction unit belongs is therefore enabled on the basis of the interaction unit for interacting with an operator. Since the display of the functional module data which belong to a functional module therefore results in an interaction of the interaction unit with the operator or depends on an interaction of the operator with the interaction unit, the assignment of displayed functional module data to the actual functional module is facilitated. The commissioning or maintenance of the fire alarm and/or extinguishing control center is therefore made easier for the operator since, in addition to displaying the functional module data belonging to a functional module, an interaction with the associated functional module is also carried out. The susceptibility to errors when connecting participants, for example, to the functional module data can therefore be reduced. Commissioning and/or maintenance can also be simplified since confusion of the functional module whose associated functional module data are displayed becomes less probable on the basis of the interaction.

In this case, an interaction denotes at least one-sided communication, that is to say, in particular, communication from the interaction unit to the operator or communication from the operator in the direction of the interaction unit. In other words, an interaction unit may comprise an input unit, an output unit or a combined input and output unit.

The display and operating unit may be a display and operating unit which is integrated in the fire alarm and/or extinguishing control center, for example is arranged on the housing of the fire alarm and/or extinguishing control center. In one embodiment, the display and operating unit may be in the form of a touchscreen in the case of which the display and operation can be carried out in the same region of the display and operating unit. In another embodiment, the display and operating unit may also have operating elements which are arranged in a region which differs from the display, for example in the form of knobs, pushbuttons, switches, etc. In another embodiment, the display and operating unit can also be provided remotely from the housing of the fire alarm and/or extinguishing control center and can be connected to the fire alarm and/or extinguishing control center in a wired and/or wireless manner. In this embodiment, the display and operating unit may be designed as a notebook, a tablet, a smartphone or the like, for example. It goes without saying that the configurations of the display and operating unit mentioned should be understood merely as an example, in which case other configurations can also be advantageously used.

In one embodiment, the interaction unit comprises an actuating element, in particular a switch or a pushbutton, wherein the method comprises the following steps of:

a) actuating the actuating element of one of the functional modules by the operator, b) identifying the functional module associated with the actuation, c) providing functional module data relating to the identified functional module, and d) displaying the functional module data on the display and operating unit.

In this embodiment, the interaction unit therefore makes it possible, by actuating the actuating element of a functional module, to display the functional module data belonging to the functional module on the display and operating unit in response to the actuation. A correlation between the functional module and the functional module data displayed on the display and operating unit is possible by simply actuating the actuating element. Even though a switch and a pushbutton have been mentioned as examples of the actuating element in this embodiment, other configurations of an actuating element are also possible in other embodiments.

In one embodiment, upon actuation of the actuating element, the functional module transmits an identifier to the central control unit, wherein the central control unit provides the functional module data on the basis of the identifier.

The identifier may be preprogrammed, for example, or may be allocated during the commissioning of the fire alarm and/or extinguishing control center. The allocation is preferably carried out automatically by means of a suitable algorithm. Alternatively or additionally, the identifier may also have a different design, for example may be coding which is permanently programmed or connected in the functional module.

The identifier in the modules is preferably produced by the order of the modules on the bus. It may be allocated in a bucket chain method, for example, and can be checked against the configuration data. The identifier of a functional module is unique, that is to say each functional module has an individual and distinguishable identifier. On the basis of this identifier, the central control unit can then assign the functional module data of the corresponding functional module and can provide said data for display on the display and operating unit.

In one embodiment, the functional module transmits the functional module data to the central control unit at least partially in addition to the identifier and/or the central control unit reads the functional module data from a memory on the basis of the identifier.

In one case, the functional module data are therefore preferably partially available in a memory contained in the functional module. In this case, they can then be transmitted to the central control unit together with the identifier when the actuating element is actuated. In a further embodiment, the functional module data can also be requested by the central control unit subsequently, that is to say after the identifier has been transmitted, and can be transmitted by the functional module in response to the request. Alternatively or additionally, the central control unit preferably reads the functional module data from a further memory. In one embodiment, the further memory is inside the fire alarm and/or extinguishing control center, in particular the central control unit, wherein it can also be arranged remotely from the fire alarm and/or extinguishing control center in other embodiments, for example on a server connected via a data connection, in particular an Internet connection.

In one embodiment, the interaction unit has an optical display unit, in particular a lighting unit, wherein the method comprises controlling the optical display unit of that functional module whose functional module data are displayed on the display and operating unit.

A process of controlling the lighting unit preferably comprises at least switching on, operating the lighting unit in a flashing mode, setting the color of the lighting unit on the basis of the functional module data or controlling the optical display unit with a variable light intensity. Combinations of the various types of control are also advantageously conceivable.

In this embodiment, the interaction unit therefore has an output unit in the form of an optical display unit. The lighting unit can preferably be in the form of a light-emitting diode or a collection of light-emitting diodes of one particular color or of a plurality of colors. Displayed functional module data can be easily assigned to the associated functional module by controlling the optical display element in response to the display of functional module data assigned to a functional module.

The output of the optical display unit can preferably be changed on the basis of the functional module data; for example, the optical display unit can emit red light if an error is present, whereas it emits green light during error-free operation. Other ways of controlling the display unit are also possible in other embodiments.

In one embodiment, the interaction unit has an optical display unit, in particular a lighting unit, wherein the method comprises:

a) identifying one of the functional modules on the basis of an input to the display and operating unit, b) providing functional module data belonging to the identified functional module, c) displaying the functional module data on the display and operating unit, and d) controlling the optical display unit of the identified functional module.

It should be noted that the stated order of the method steps does not imply their temporal sequence. In particular, steps b) and d) can be carried out at the same time or else in temporal succession beginning with either of steps b) and d).

The optical display unit can therefore be controlled independently of a preceding display of functional module data and on the basis of only the input to the display and operating unit.

In another embodiment, the input itself may be part of the functional module data, for example a group number which is introduced below and is displayed for the input. In this embodiment, step b) can be provided as an optional step since step c) is already carried out by displaying the input data without the need to provide further functional module data.

In another embodiment, a combination of both alternatives of the interaction unit is conceivable, wherein the interaction unit then has an optical display unit and an actuating unit. In this embodiment, the optical display unit is preferably controlled in response to the actuation of the actuating unit.

In one embodiment in which the interaction unit has an input unit, for example in the form of a switch or a pushbutton, the functional module data can therefore be displayed in response to an input to the interaction unit. Alternatively or additionally, if the interaction unit has an output unit, in particular in the form of an optical display unit, an output of the interaction unit can be effected in response to displayed functional module data. The causality order is therefore reversed depending on the input or output of an interaction to or from the interaction unit. In both ways, the method according to the invention enables an advantageous link or correlation between displayed functional module data and the associated physical functional module.

In one embodiment, the identification of one of the functional modules has the following steps of:

a) inputting a search term, in particular a group number, by means of the display and operating unit, b) transmitting the search term to the central control unit, wherein the identification is carried out on the basis of the search term transmitted to the central control unit.

A group number identifies or indicates a group of participants which can be connected to a connection or a pair of connections of the functional module. A functional module may have, for example, connections for connecting four groups of participants without being restricted thereto. During the configuration of the fire alarm and/or extinguishing control center, the group numbers are therefore assigned to at least one particular connection of a functional module. Although a group number is used, by way of example, for a search term in this example, other search terms may also make it possible to identify the functional module. For example, it is possible to search for an identifier of the functional module or for further data which are part of the functional module data.

In one embodiment, at least one participant which can be connected to at least one of the functional modules additionally has an interaction unit for interacting with the operator, wherein the method is adapted in such a manner that the display and operating unit displays participant data belonging to the participant and/or functional module data belonging to the associated one of the functional modules, wherein the display of the participant data and/or the functional module data depends on an interaction of the interaction unit of the participant and/or the interaction of the interaction unit of the participant depends on the display of the participant data and/or functional module data.

In this embodiment, the advantages of identifying and assigning functional modules also extend to the participants which are connected or can be connected to the functional modules. The interaction unit of the participants may comprise, for example, a light-emitting diode, an alarm tone generator, or else pushbuttons or switches or any desired combination thereof. For example, when functional module data belonging to a functional module are displayed, one, more or all of the interaction units of the participants connected to the functional module can react with the user. It is thus possible to additionally monitor whether these participants are operating properly and are connected correctly.

In another aspect, the object is achieved by means of a method for commissioning and/or maintaining a fire alarm and/or extinguishing control center by means of a display and operating unit, wherein the fire alarm and/or extinguishing control center has a central control unit and a plurality of functional modules connected to the central control unit, wherein the display and operating unit is connected or can be connected to the central control unit and is configured to execute augmented reality functions on a display of the display and operating unit, wherein each of the functional modules has a plurality of connections for connecting participants, in particular fire alarms, signal generators and/or actuators, wherein the method is adapted in such a manner that the display and operating unit displays functional module data belonging to one of the functional modules in the form of augmented reality.

According to this aspect, there is no need to provide an interaction unit on the functional modules because the interaction is replaced with a display in the form of augmented reality. The user can therefore receive a display of data belonging to the functional module superimposed over at least one section of an image of the fire alarm and/or extinguishing control center in which a functional module is mounted, for example, using the display and operating unit. The at least one section comprises, for example, an image of the relevant functional module or parts of the latter. In another example, in order to mount one of the functional modules, a location for mounting the functional module to be mounted can also be displayed in at least one section of an image of the fire alarm and/or extinguishing control center. The functional module whose data are displayed using augmented reality can be selected directly on the display and operating unit, for example. The amount and the presentation of the functional module data to be displayed can also preferably be set using the display and operating unit.

In one embodiment, the display and operating unit has data glasses and/or a tablet with a camera. The camera is preferably configured to record the image or the at least one section of the image of the fire alarm and/or extinguishing control center. The use of augmented reality is known both for a tablet and for data glasses in other applications. Other suitable display and operating units are naturally also possible.

In one embodiment, at least one functional module has an interaction unit for interacting with an operator, wherein the display of the functional module data depends on an interaction of the interaction unit of the functional module.

It is therefore preferably possible to ensure, by simply interacting with the interaction unit of the functional module, that the functional module data are displayed in the form of augmented reality, for example by means of superimposition over an image of the functional module, by means of the display and operating unit. A selection of the functional module to be examined is therefore simplified and it is possible to check the correct mounting.

In one embodiment of one of the methods according to the invention, the functional module data comprise data from one, more or all of the following groups:

information data which are stored in the fire alarm and/or extinguishing control center, in particular in the central control unit or the display and operating unit, in particular at least one element from a) a connection assignment, b) a data sheet, c) instructions and/or d) auxiliary information, static module data which are stored in a memory of the respective functional module, in particular at least one element from e) a module type and manufacturing data such as f) a serial number, g) a batch number, h) a production date, i) a production location, g) a hardware revision number and/or k) other manufacturing data, configuration data which are stored in a memory of the central control unit and/or in the memory of the respective functional module and/or in a memory of the fire alarm and/or extinguishing control center, in particular at least one element from l) a slot number, m) a group and information relating to the group which is assigned to the module and/or n) an address of the functional module, and runtime module data which are captured during the runtime by the respective functional module, in particular at least one element from o) a module error, p) a module error history, q) an instantaneous module state, r) a software version, s) an initial commissioning date, t) operating hours and/or u) instantaneous currents of limit value groups.

Data from one, more or all of the groups mentioned may be stored in the same memory or in different memories, for example in an internal storage module in the central control unit, an external control module and/or a module memory of the functional module. The cited functional module data are exemplary and other functional module data may also be alternatively or additionally present in other embodiments.

In one embodiment, the fire alarm and/or extinguishing control center is configured to change the connections of at least one of the functional modules to a commissioning mode or maintenance state during commissioning and/or maintenance, wherein the connections of the functional module(s) are deactivated in the commissioning mode or maintenance state.

In this system state or system mode, the functional modules are preferably switched to be non-functional, that is to say participants, for example extinguishing apparatuses, are not controlled and no events detected by participants are forwarded to superordinate systems. It is therefore possible to prevent unwanted triggering of alarms or extinguishing processes with all associated consequences. The maintenance state or commissioning mode can preferably be activated via the display and operating unit, and, more preferably, the commissioning mode can be deactivated by means of the display and operating unit after the commissioning and/or maintenance has/have been concluded. As a result of the commissioning mode being deactivated, the connections of the functional module(s) are activated and the fire alarm and/or extinguishing control center becomes operational.

In one embodiment, the display and operating unit is configured to display the functional module data using a browser which accesses a web server. The web server may be provided, for example, in the central control unit itself or on a remotely arranged server. Other display technologies, for example in the form of application programs, are also conceivable in other embodiments.

In one embodiment, the display and operating unit is configured to display error information associated with a particular participant or a functional module. The error information is assigned to a functional module either directly or indirectly, since the group of participants comprising the particular participant is assigned to a functional module, and can therefore be part of the functional module data. On the basis of the display of the error information, a maintenance engineer can cause an interaction of the interaction unit of the associated functional module and can carry out the maintenance in a particularly efficient manner since the localization of the error is simplified.

In addition, the severity of the error, for example a graduated display between green, orange and red, can preferably be displayed using color coding of an optical display unit, for example. As soon as the error has been eliminated, the display of the error information and/or the display of the optical display unit adapted to the error can be terminated.

Another aspect provides a system for commissioning and/or maintaining a fire alarm and/or extinguishing control center, wherein the system has a fire alarm and/or extinguishing control center and a display and operating unit, wherein the fire alarm and/or extinguishing control center has a central control unit and a plurality of functional modules connected to the central control unit, wherein the display and operating unit is connected or can be connected to the central control unit, wherein each of the functional modules has a plurality of connections for connecting participants, in particular fire alarms, signal generators and/or actuators, and an interaction unit for interacting with an operator, wherein the display and operating unit is configured to display functional module data belonging to one of the functional modules, wherein the display of the functional module data depends on an interaction of the interaction unit of the functional module and/or the interaction of the interaction unit of the functional module depends on an input and/or the display of the functional module data.

Another aspect provides a system for commissioning and/or maintaining a fire alarm and/or extinguishing control center, wherein the system has a fire alarm and/or extinguishing control center and a display and operating unit, wherein the fire alarm and/or extinguishing control center has a central control unit and a plurality of functional modules connected to the central control unit, wherein the display and operating unit is connected or can be connected to the central control unit and is configured to execute augmented reality functions on a display of the display and operating unit, wherein each of the functional modules has a plurality of connections for connecting participants, in particular fire alarms, signal generators and/or actuators, wherein the display and operating unit is configured to display functional module data belonging to one of the functional modules in the form of augmented reality.

Each of the systems according to the invention enables the same advantages as have already been described for the various embodiments and aspects of the method according to the invention. The preferred configurations of the method can likewise also be advantageously applied to the system according to the invention.

Another aspect provides a display and operating unit for use in a system according to the invention, which is arranged outside the fire alarm and/or extinguishing control center, wherein the display and operating unit is configured to display functional module data belonging to one of functional modules, wherein the display of the functional module data depends on an interaction of the interaction unit of the functional module and/or the interaction of the interaction unit of the functional module depends on an input and/or the display of the functional module data.

By virtue of the fact that the display of the functional module data depends on an interaction of the interaction unit and/or the interaction of the interaction unit depends on the display of the functional module data, the display and operating unit according to the invention enables the advantageous correlation or connection of displayed functional module data and the associated functional module. Commissioning and/or maintenance is/are therefore possible with reduced susceptibility to errors and a reduced amount of effort.

The display and operating unit can communicate with the central control device of the fire alarm and/or extinguishing control center in a wired or wireless manner.

The display and operating unit according to the invention may be, for example, a portable computer, in particular a notebook, a tablet or a smartphone, which is equipped with corresponding software for use in the system according to the invention for commissioning and/or maintaining a fire alarm and/or extinguishing control center.

Another aspect provides a functional module for use in a system according to the invention, wherein the functional module has a plurality of connections for connecting participants, in particular fire alarms, signal generators and/or actuators, and an interaction unit for interacting with an operator.

The functional module according to the invention can therefore be used to achieve the advantages which can be achieved with the system or method according to the invention when commissioning and/or maintaining a fire alarm and/or extinguishing control center. In particular, the interaction unit may have an optical display unit, an actuating element or both an optical display unit and an actuating element.

In one embodiment, the interaction unit has an optical display unit, in particular a lighting unit, and/or an actuating element, in particular a switch or a pushbutton.

In one embodiment of the functional module, the interaction unit has an optical display unit which is a multi-colored lighting unit, in particular, wherein the functional module is configured to control the lighting unit on the basis of functional module data relating to the functional module. The control process comprises, in particular, adapting the light intensity and/or the color and/or a flashing pattern of the optical display unit.

In one embodiment of the functional module, the interaction unit has an actuating element, wherein the actuating element is in the form of a pushbutton, wherein the functional module is configured to disconnect a contact of the connections on the basis of actuation of the pushbutton.

By virtue of the fact that the functional module disconnects the contact of the connections on the basis of actuation of the pushbutton, the functional modules are preferably switched to be non-functional, that is to say unwanted triggering of alarms or extinguishing processes with all associated consequences is prevented. Electric shocks during connection can also be avoided. Different forms of actuation which have different effects are preferably possible. For example, the contact of the connections can be disconnected only when the pushbutton is actuated for a certain time. If the period for which the pushbutton is actuated does not reach the predetermined period, the functional module can cause the display of the functional module data on the display and operating unit without disconnecting the contact of the connections. Other ways of controlling the actuation are also conceivable.

Another aspect provides a fire alarm and/or extinguishing control center having a central control unit and a plurality of functional modules according to the invention which can be connected to the central control unit.

According to another aspect, the object is achieved by a use of data glasses and/or a tablet for commissioning and/or maintaining a fire alarm and/or extinguishing control center. The fire alarm and/or extinguishing control center has a central control unit and a plurality of functional modules connected to the central control unit. Data glasses and/or a tablet is/are display units which can be used in a particularly intuitive and therefore effective manner and can display information useful for the commissioning and/or maintenance.

The data glasses and/or the tablet is/are preferably configured to display functional module data relating to at least one of the functional modules in the form of augmented reality. The commissioning and/or maintenance is/are therefore already facilitated by virtue of the fact that the reality which is visible on the tablet or in the data glasses, for example, is extended with useful information such as functional module data. The display unit is naturally not restricted to data glasses and/or a tablet and other forms of display apparatuses which provide augmented reality functions are also conceivable.

BRIEF DESCRIPTION OF THE DRAWINGS

Further embodiments emerge on the basis of the exemplary embodiments described in more detail below. In this respect.

MODE(S) FOR CARRYING OUT THE INVENTION

Figure 1:
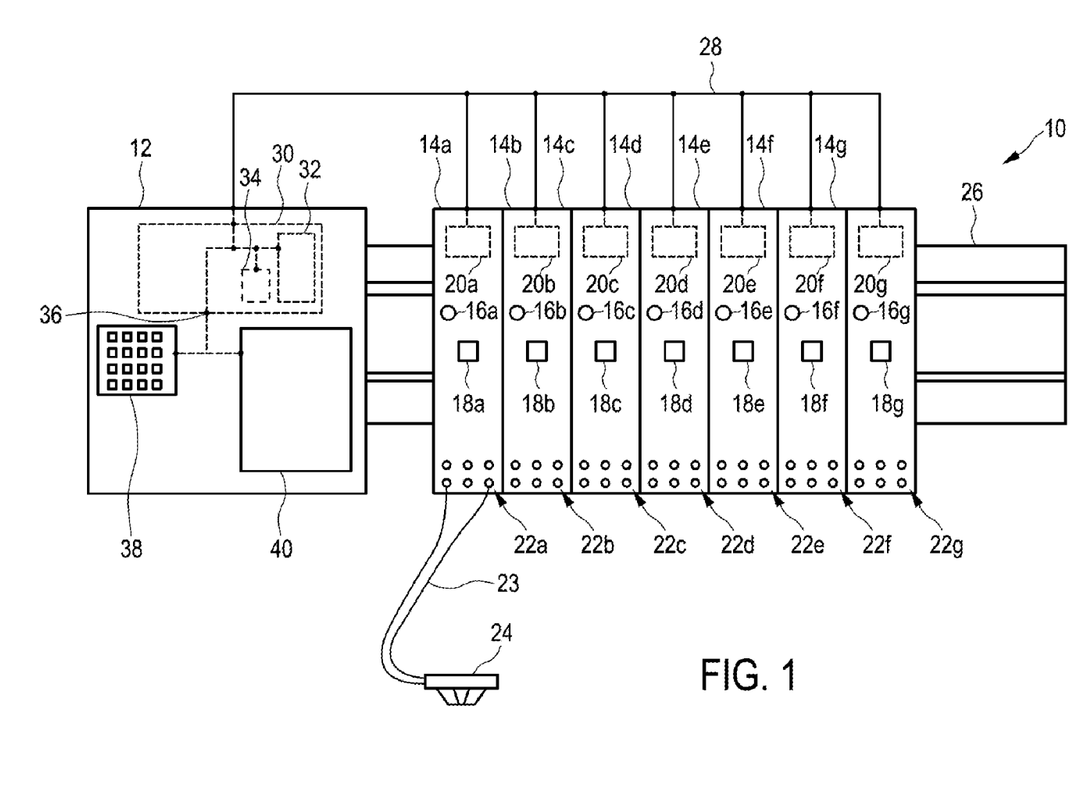
FIG. 1 shows one exemplary embodiment of the apparatus according to the invention.

FIG. 1 shows a fire alarm and/or extinguishing control center 10 having a central component 12 and a plurality of functional modules 14a to 14g connected to the central component 12 by means of a bus system 28. The fire alarm and/or extinguishing control center is mounted, for example, in a switchgear cabinet (not shown) from which connection lines 23 are routed to participants 24, for example fire detectors, spark detectors or any desired other sensor or actuator components.

The functional modules 14a to 14g each have a lighting unit 16a to 16g and a switch or pushbutton 18a to 18g. Optional memories 20a to 20g which are illustrated using dashed lines are respectively arranged as part of the functional modules 14a to 14g. In the present case, each of the functional modules 14a to 14g has a plurality of connections 22a to 22g. In this exemplary embodiment, each of the functional modules 14a to 14g has exactly six connections 22a to 22g. According to other exemplary embodiments, the functional modules 14a to 14g have an arbitrary number of connections 22a to 22g which corresponds to their function, however. The number of connections illustrated here is selected only in an exemplary manner.

One or more participants 24 which comprise, for example, as mentioned above, fire detectors, spark detectors or any desired other sensor or actuator components can be connected to a fire alarm and/or extinguishing control center 10 at the connections 22a to 22g. In the present case, a schematically illustrated fire alarm is connected to two of the connections 22a of the functional module 14a via electrical lines 23.

A group of participants 24 which, as shown in FIG. 1, may comprise one participant or, in other examples, also a plurality of participants 24 is connected to a connection or a pair of connections. Each group of participants is indicated or identified by a group number. The assignment of groups which are identified by a group number to particular connections 22a to 22g of a particular functional module 14a to 14g is stipulated in the circuit diagram of the fire alarm and/or extinguishing control center 10. During the commissioning and/or maintenance of the fire alarm and/or extinguishing control center, it must be ensured that the lines of the respective groups of participants 24 have been or are connected to the correct connections 22a to 22g.

As mentioned, the functional modules 14a to 14g are preferably arranged inside a housing (not shown) of the fire alarm and/or extinguishing control center 10, which housing is in the form of a switchgear cabinet, for example. In contrast, the participants 24 are arranged outside the switchgear cabinet in a building, building complex or area to be monitored. In other words—with the exception of the participants 24—all components shown in FIG. 1 can be arranged inside the housing of the fire alarm and/or extinguishing control center 10. The electrical lines 23 between the functional modules 14a to 14g and the participants 24 may actually be substantially longer than illustrated here for better clarity in FIG. 1.

The functional modules 14a to 14g are connected to a central control unit 30 via a data connection, for example a bus system 28. The central control unit 30 is designed as part of the central component 12 and comprises a memory 32 and a processor 34. The central control unit 30 also comprises a data interface 36. This data interface 36 is illustrated as an internal data interface here. The data interface 36 is connected to a user input unit 38 and to a display unit 40 which, in the present exemplary embodiment, are part of the fire alarm and/or extinguishing control center 10. The user input unit 38 and the display unit 40 may also be in the form of a combined display and operating unit, for example in the form of a touchscreen.

In this exemplary embodiment, the lighting unit 16a of the functional module 14a is additionally activated after actuation of the pushbutton 18a, with the result that the lighting unit emits light. The lighting unit 16a is, for example, a multicolored light-emitting diode which emits light in a predefined color on the basis of the operating mode of the functional module 14a. For example, the lighting unit 16a emits green light if the functional module 14a is in the normal mode. If, for example, the connections 22a are not yet connected to participants 24 and the functional module 14a is therefore not yet ready for use, the lighting unit 16a emits yellow light. In the event of a fault in the functional module 14a or in one of the participants 24 connected to the latter, the lighting unit 16a emits red light, for example. Alternatively, the lighting unit 16a can emit light in different intensities or else can flash at different speeds, to name just a few examples.

An information mode of the functional module 14a can be activated by actuating the pushbutton 18a to 18g, wherein the information mode of the functional modules 14a to 14g can also alternatively or additionally be activated by the user input unit 38, for example, in other embodiments. In the information mode, no electrical voltage is preferably applied to the connections 22a to 22g in order to prevent unwanted triggering of alarms or extinguishing processes with all associated consequences and to avoid electric shocks or injuries when connecting the connection lines 23.

According to the example in which the switch or pushbutton 18a has been actuated and the lighting unit 16a, activated by the processor 34 of the central control unit 30, now emits light, information stored for the functional module 14a is also retrieved from the memory 20a, for example, by the processor 34 and is output via the data interface 36 for display using the display unit 40. This information shows, for example, that the functional module 14a is connected or is intended to be connected, at its connections 22a, precisely to the participant 24 illustrated according to the illustration in FIG. 1. If the participant 24 is therefore not yet connected, it is specified to the personnel carrying out the commissioning where exactly the participant 24 should now be connected. In other exemplary embodiments, the functional module data are partially or completely loaded from other memories, for example the memory 32 of the central component 12 or a remotely arranged memory, for example on a server which is connected to the fire alarm and/or extinguishing control center via the Internet.

According to the invention, the fire alarm and/or extinguishing control center 10 is therefore configured in such a manner that, during the commissioning or maintenance, a user is provided with a simplified possibility for finding the correct connections 22a to 22g for the participant 24 or the group of participants 24. The method shall be described, by way of example, using the functional module 14a. A user presses the switch or pushbutton 18a, whereupon the activation of the switch or pushbutton 18a is ascertained using the processor 34 via the bus system 28. The processor 34 can then display functional module data, which contain, in particular, information relating to the participants or participant groups to be connected to the connections 22a, on the display unit 40. This makes it possible for the display of the display unit 40 to assist with the connection of the groups of participants 24 to the connections 22a since the assignment is simplified by displaying precisely the connection data on the display unit 40 which belong to the functional module 14a whose pushbutton 18a has been pressed.

In one exemplary embodiment, the connection lines 23 and/or the connections 22a may have, for example, color coding which is displayed on the display unit 40 for the purpose of assisting with the connection and facilitates the assignment of a connection line 23 to the correct ones of the connections 22a to 22g.

For example, the display of the connection assignment may comprise a graphical representation of the connections 22a to 22g, wherein all connections stored with red in the display correspond to a connection of the positive pole of the connection line 23 and all connections stored with blue in the display correspond to a connection of the negative pole of the respective connection line 23. A corresponding color coding can preferably also be gathered from the connection line 23. In addition to the graphical representation of the connections 22a to 22g or of the entire functional module 14a to 14g, a group number which is assigned to the respective connections can be displayed at a corresponding location.

In one exemplary embodiment, functional module data belonging to the functional module 14a can be displayed in three sections, for example among one another, as indexes, tabs and/or frames. The first section comprises the connection assignment just described. Further functional module data, for example hardware version, software version, date of the initial commissioning, operating hours and instantaneous currents of the limit value groups, are displayed in a second section. Error information relating to the functional module 14a and the subscriber groups to be connected to the latter, which enables simplified maintenance, can be displayed in a third section. In other exemplary embodiments, the display may naturally also be different and may comprise alternative or additional elements.

The method in which functional module data belonging to the functional module 14a are displayed on the display unit 40 in response to an interaction with the pushbutton 18a has hitherto been described. The reverse case is also conceivable, in which an input is first of all made using the user input unit 38, whereupon the display unit 40 displays functional module data relating to one of the functional modules 14a to 14g. An interaction of the corresponding functional module 14a to 14g follows in response; in particular, the associated lighting unit 16a to 16g is controlled. As stated above, the control process comprises switching on, control in a flashing state or, in the case of a color lighting unit, operation with a particular color. In this exemplary embodiment, a group number of a particular group of participants 24 can be input via the user input unit 38, for example. Each group which is identified using a particular group number is assigned to one of the functional modules 14a to 14g. An installer commissioning the fire alarm and/or extinguishing control center 10, for example, can therefore hold the connections of a particular connection group in his hand, can search for their number using the user input unit 38 and can receive a display of the connection position of the corresponding functional module 14a to 14g via the display unit 40. The corresponding functional module 14a to 14g additionally interacts with the user by controlling the associated lighting unit 16a to 16g. The combination of the displayed information on the display unit 40 with the interaction of the lighting unit 16a to 16g ensures that the connection of the participants 24, for example the group of participants 24, to the correct ones of the connections 22a to 22g is simplified.

In this example, the functional module data which are displayed comprise, in particular, the connection configuration of one of the groups of connections 22a to 22g. Depending on the configuration of the fire alarm and/or extinguishing control center 10, it is possible to display further information relating to the functional module 14a to 14g which is retrieved either from the memory of the functional module 14a to 14g or from another memory.

In summary, the user who has previously input the identifier of the participant 24 or the group number of the group to which the participant 24 belongs via the user input unit 38 can immediately discern, by virtue of the lighting unit 16a being switched on, that the participant 24 should be connected to the functional module 14a. Precise information, for example the precise connections 22a to which the electrical lines 23 of the participant 24 should be connected, is also graphically presented on the display unit 40. Installation is therefore possible in a simple and less error-prone manner.

Furthermore, the concept can also be applied to the individual participants 24 which may likewise have an interaction unit. An input to or an interaction with the interaction unit, which belongs to the participant 24 and may be in the form of a switch, a pushbutton or the like for example, can then cause, for example, functional module data belonging to that one of the functional modules 14a to 14g to which the triggered participant 24 belongs to be displayed on the display unit 40. As an alternative or in addition to the display of the functional module data, data relating to the triggered participant 24 itself may also be displayed.

Conversely, an interaction of the interaction unit of selective participants 24, for example all participants 24 in a group or all participants 24 connected to a module, can likewise be triggered by means of an input for operating or actuating the display unit 40, for example by selecting a participant group or simply by displaying functional module data relating to a functional module 14a to 14g. Alternatively or additionally, an individual participant 24 can also be selected or data belonging to an individual participant can be displayed in order to trigger an interaction of the associated interaction unit of the participant 24. The interaction unit may comprise, for example, a light signal transmitter such as an LED or else an alarm signal transmitter.

Figure 2:
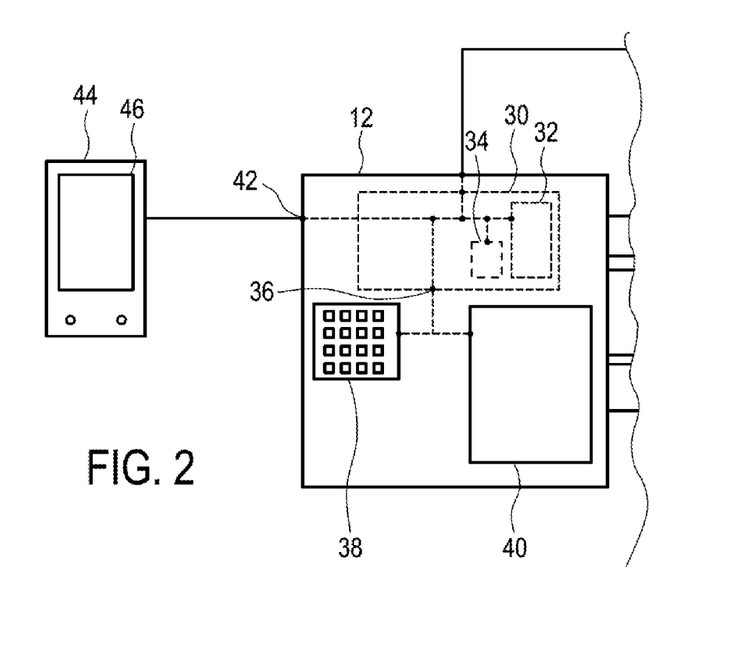
FIG. 2 shows another exemplary embodiment of the apparatus according to the invention.

FIG. 2 shows another exemplary embodiment, wherein only the central component 12 is illustrated here instead of the entire fire alarm and/or extinguishing control center 10. In this exemplary embodiment, the fire alarm and/or extinguishing control center 10 has a further data interface 42 which is configured to be connected to an external display unit or to an external user input unit in a wired or wireless manner. In the present example, the further data interface 42 is connected to a tablet computer 44 having a touch-sensitive display 46 which constitutes a combined display and operating unit. The external display unit and/or user input unit can be provided as an alternative or in addition to the internal display unit 40 and/or user input unit 38. Although a tablet computer 44 is used as an external display unit and/or user input unit in this example, PCs, notebooks, internally developed apparatuses or smartphones are also conceivable in other exemplary embodiments.

It has been found to be particularly advantageous if the external display unit has an augmented reality or "virtual reality" function. Functional module data or other information relevant to the commissioning and/or maintenance can thereby be superimposed on the reality, for example on a photo or a section of the latter recorded by a camera, and can therefore be directly provided at the relevant location. The tablet computer 44 preferably has augmented reality functions, wherein data glasses or other suitable apparatuses can likewise be used. Data glasses, in particular, have the advantage that the installer has both hands available for work.

Figure 3:
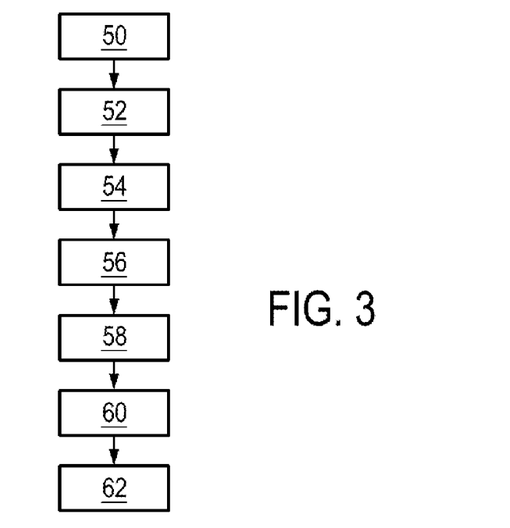
FIG. 3 shows the steps of one exemplary embodiment of the method according to the invention.

FIG. 3 shows the steps of one exemplary embodiment of the method according to the invention. In step 50, a switch or a pushbutton 18a to 18g of one of the functional modules 14a to 14g is actuated. Actuating the switch or pushbutton 18a to 18g optionally activates in step 52 an information mode of the associated functional module 14a to 14g whose switch or pushbutton 18a to 18g has been actuated. In the information mode, the connections 22a to 22g at least of the associated one of the functional modules 14a to 14g are preferably at zero potential.

In step 54, functional module data for the functional module 14a to 14g whose pushbutton has been pressed are displayed on the internal or external display unit 40.

In step 56, lighting units 16a to 16g of the functional module(s) 14a to 14g whose information mode has been activated by pressing the associated switch or pushbutton 18a to 18g are controlled optionally and independently of step 54.

Step 58 denotes deactivation of the information mode, that is to say that the functional module(s) change(s) to an operating mode again in which voltage is present on the connections 22a to 22g. The transition to the operating mode is carried out either by actuating the switch or pushbutton 18a to 18g again in one embodiment or by means of an input to the user input unit 38 in another exemplary embodiment.

In the subsequent optional step 60, the lighting unit 16a to 16g which has previously been switched on can then be switched off again and, in the final optional step 62, the display of the display unit 40 can be modified again in such a manner that the functional module data relating to the functional modules 14a to 14g are no longer displayed. For example, the display unit 40 can change to a quiescent state or to a standard display.

The method can be carried out as often as desired for different functional modules 14a to 14g in succession or can be carried out for a plurality of functional modules 14a to 14g at the same time.

Figure 4:
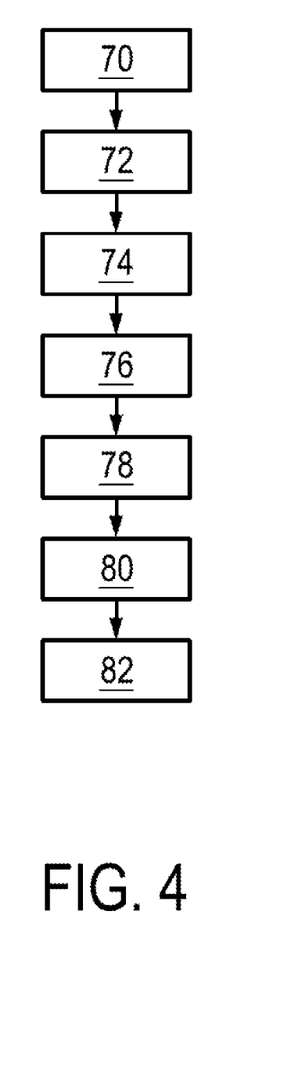
FIG. 4 shows the steps of another exemplary embodiment of the method according to the invention.

FIG. 4 shows the steps of another exemplary embodiment of the method according to the invention. The scenario shown in FIG. 4 differs from the scenario shown in FIG. 3 to the effect that the source of the interaction of the functional module 14a to 14g is the functional module itself and not the operator who makes an input to the functional module. In step 70, an input is made using the operator input unit 38 and is used to search for a particular participant group, for example.

In step 72, the functional module data belonging to the search term which has been input or the associated functional module 14a to 14g is/are identified.

In step 74, the lighting unit 16a to 16g belonging to the identified one of the functional modules 14a to 14g is controlled, for example is caused to emit light. Functional module data relating to the corresponding functional module 14a to 14g may additionally be displayed on the display unit 40.

In the optional step 76, the associated one of the functional modules 14a to 14g or all of the functional modules 14a to 14g can be switched to an information mode in which the connections 22a to 22g are at zero potential. The process of switching to the information mode can be carried out automatically or may depend on a user input.

If the display of the display unit is changed in a step 78, with the result that the functional module data relating to the associated one of the functional modules 14a to 14g are no longer displayed, for example on account of a user input to the user input unit 38, the control of the corresponding lighting unit 16a to 16g is changed in a subsequent step 80; for example, light emission of the unit is terminated. In an optional step 82, the information mode of the functional module(s) 14a to 14g can finally also be terminated. This can also be carried out either automatically or on the basis of a user input.

Functional module data may comprise, for example, information data which are stored in the apparatus or the system, including the display and operating unit 38, 40. The information data may comprise a connection assignment, that is to say positive, negative etc., which stipulates how the connections 22a to 22g of the functional modules 14a to 14g should be connected. The information data may additionally comprise auxiliary information, for example data sheets, information describing how to handle the functional module 14a to 14g and much more. The information data can be transmitted by transmitting configuration data to the central control unit 30 of the fire alarm and/or extinguishing control center 10 and/or to a computer unit of one of the functional modules 14a to 14g.

The functional module data may also comprise static module data, for example a module type, manufacturing data such as a serial number, a batch number, a production date, a production location, a hardware revision number and further manufacturing data. These are preferably stored in a memory 20a to 20g of the respective functional module 14a to 14g.

Furthermore, the functional module data may contain configuration data, for example a slot number, an address of the functional module 14a to 14g and at least one designation of a group of participants 24 and information relating to the group assigned to one of the functional modules 14a to 14g. For example, this information may contain the exact connection 22a to 22g to which the group should be connected. The configuration data may be stored in the memory 32 of the central control unit 34 and/or in the memory of the functional module 14a to 14g or in a further memory, for example an external memory.

As a further example, the functional module data may comprise runtime module data which contain, for example, an error, an error history and an instantaneous state of the functional module 14a to 14g. For example, if one of the functional modules 14a to 14g is a limit value module, the instantaneous module state can indicate that lines are triggered in the case of a limit value module. In this case, instantaneous line currents can be displayed. Further runtime module data may comprise, for example, a software version, initial commissioning, operating hours and instantaneous currents of the limit value groups. The runtime module data are preferably captured during the runtime by the functional module 14a to 14g and are stored in a memory, for example the memory 32 of the central control unit 30 and/or in the memory of the functional module 14a to 14g. In other exemplary embodiments, the functional module data may also contain further data.

The invention therefore relates to a method for assisting with the commissioning and/or maintenance of a fire alarm and/or extinguishing control center 12 comprising a central control unit 30, a plurality of functional modules 14a to 14g and at least one data interface 36. A display unit 40 is connected to the central control unit 30 by means of the data interface 36 and an information mode which can be activated and deactivated is respectively assigned to each of the functional modules 14a to 14g. Information is respectively stored for each of the functional modules 14a to 14g, wherein, by activating the information mode of a functional module 14a to 14g, the stored information relating to the functional module 14a to 14g whose information mode has been activated is displayed using the display unit 40 or tablet computer 44. The invention also relates to a system for carrying out the method and to a functional module.

LIST OF UTILIZED REFERENCE NUMBERS

10 Fire alarm and/or extinguishing control center
12 Central component
14a to 14g Functional modules
16a to 16g Lighting units
18a to 18g Switches or pushbuttons
20a to 20g Memories of the functional modules
22a to 22g Connections of the functional modules
23 Electrical lines
24 Participants
26 Top-hat rail
28 Bus system
30 Central control unit
32 Memory of the central control unit
34 Processor of the central control unit
36 Interface of the central control unit

38 User input unit
40 Display unit
42 Further data interface
44 Tablet computer
46 Display
50 to 82 Steps of the method

The invention claimed is:

1. A method for commissioning and/or maintaining a fire alarm and/or extinguishing control center by a display and operating unit,
   wherein the fire alarm and/or extinguishing control center has a central control unit and a plurality of functional modules connected to the central control unit,
   wherein the display and operating unit is connected or can be connected to the central control unit,
   wherein each of the functional modules has a plurality of connections for connecting participants including fire alarms, signal generators and/or actuators, and an interaction unit for interacting with an operator,
   wherein the method is adapted in such a manner that the display and operating unit displays functional module data belonging to one of the functional modules, wherein the display of the functional module data depends on an interaction of the interaction unit of the functional module and/or the interaction of the interaction unit of the functional module depends on the display of the functional module data.

2. The method as claimed in claim 1, wherein the interaction unit comprises an actuating element, wherein the method comprises the following steps of:
   actuating the actuating element of one of the functional modules by the operator,
   identifying the functional module associated with the actuation,
   providing functional module data relating to the identified functional module, and
   displaying the functional module data on the display and operating unit.

3. The method as claimed in claim 2, wherein, upon actuation of the actuating element, the functional module transmits an identifier to the central control unit, wherein the central control unit provides the functional module data on the basis of the identifier.

4. The method as claimed in claim 3, wherein the functional module transmits the functional module data to the central control unit at least partially in addition to the identifier and/or the central control unit reads the functional module data from a memory on the basis of the identifier.

5. The method as claimed in claim 2, wherein the interaction unit has an optical display unit having a lighting unit wherein the method comprises controlling the optical display unit of that functional module whose functional module data are displayed on the display and operating unit.

6. The method as claimed in claim 1, wherein the interaction unit has an optical display unit having a lighting unit, wherein the method comprises
   identifying one of the functional modules on the basis of an input to the display and operating unit,
   providing functional module data belonging to the identified functional module,
   displaying the functional module data on the display and operating unit, and
   controlling the optical display unit of the identified functional module.

7. The method as claimed in claim 6, wherein the identification of one of the functional modules has the following steps of:
   inputting a search term including a group number, by the display and operating unit,
   transmitting the search term to the central control unit,
   wherein the identification is carried out on the basis of the search term transmitted to the central control unit.

8. The method as claimed in claim 1,
   wherein at least one participant which can be connected to at least one of the functional modules additionally has an interaction unit for interacting with the operator,
   wherein the method is adapted in such a manner that the display and operating unit displays participant data belonging to the participant and/or functional module data belonging to the associated one of the functional modules, wherein the display of the participant data and/or the functional module data depends on an interaction of the interaction unit of the participant and/or the interaction of the interaction unit of the participant depends on the display of the participant data and/or functional module data.

9. The method as claimed in claim 1, wherein the functional module data comprise data from one, more or all of the following groups:
   information data which are stored in the fire alarm and/or extinguishing control center including in the central control unit or the display and operating unit having at least one element from a) a connection assignment, b) a data sheet, c) instructions and/or d) auxiliary information,
   static module data which are stored in a memory of the respective functional module, having at least one element from e) a module type and manufacturing data such as f) a serial number, g) a batch number, h) a production date, i) a production location, j) a hardware revision number and/or k) other manufacturing data,
   configuration data which are stored in a memory of the central control unit and/or in the memory of the respective functional module and/or in a memory of the fire alarm and/or extinguishing control center, having at least one element from 1) a slot number, m) a group and information relating to the group which is assigned to the module and/or n) an address of the functional module, and
   runtime module data which are captured during the runtime by the respective functional module, having at least one element from o) a module error, p) a module error history, q) an instantaneous module state, r) a software version, s) initial commissioning, t) operating hours and/or u) instantaneous currents of limit value groups.

10. A method for commissioning and/or maintaining a fire alarm and/or extinguishing control center by a display and operating unit,
   wherein the fire alarm and/or extinguishing control center has a central control unit and a plurality of functional modules connected to the central control unit,
   wherein the display and operating unit is connected or can be connected to the central control unit and is configured to execute augmented reality functions on a display of the display and operating unit,
   wherein each of the functional modules has a plurality of connections for connecting participants including fire alarms, signal generators and/or actuators,
   wherein the method is adapted in such a manner that the display and operating unit displays functional module data belonging to one of the functional modules in the form of augmented reality, wherein at least one functional module has an interaction unit for interacting with an operator, and wherein the display of the functional module data depends on an interaction of the interaction unit of the functional module.

11. The method as claimed in claim 10, wherein the display and operating unit has a tablet with a camera.

12. A system for commissioning and/or maintaining a fire alarm and/or extinguishing control center, wherein the system has a fire alarm and/or extinguishing control center and a display and operating unit, wherein the fire alarm and/or extinguishing control center has a central control unit and a plurality of functional modules connected to the central control unit, wherein the display and operating unit is connected or can be connected to the central control unit, wherein each of the functional modules has a plurality of connections for connecting participants including fire alarms, signal generators and/or actuators, and an interaction unit for interacting with an operator, and wherein the display and operating unit is configured to display functional module data belonging to one of the functional modules, wherein the display of the functional module data depends on an interaction of the interaction unit of the functional module and/or the interaction of the interaction unit of the functional module depends on the display of the functional module data.

13. A system for commissioning and/or maintaining a fire alarm and/or extinguishing control center by a display and operating unit, wherein the fire alarm and/or extinguishing control center has a central control unit and a plurality of functional modules connected to the central control unit, wherein the display and operating unit is connected or can be connected to the central control unit and is configured to execute augmented reality functions on a display of the display and operating unit, wherein each of the functional modules has a plurality of connections for connecting participants including fire alarms, signal generators and/or actuators, wherein the display and operating unit is configured to display functional module data belonging to one of the functional modules in the form of augmented reality, wherein at least one functional module has an interaction unit for interacting with an operator, and wherein the display of the at least one functional module data depends on an interaction of the interaction unit of the at least one functional module.

14. A display and operating unit for use in a system as claimed in claim 12, which is arranged outside the fire alarm and/or extinguishing control center, wherein the display and operating unit is configured to display functional module data belonging to one of the functional modules, wherein the display of the functional module data depends on an interaction of the interaction unit of the functional module and/or the interaction of the interaction unit of the functional module depends on the display of the functional module data.

15. A functional module for use in a system as claimed in claim 12, wherein the functional module has a plurality of connections for connecting participants including fire alarms, signal generators and/or actuators, and an interaction unit for interacting with an operator.

16. The functional module as claimed in claim 15, wherein the interaction unit has an optical display unit having a lighting unit, and/or an actuating element including a switch or a pushbutton.

17. The functional module as claimed in claim 15, wherein the interaction unit has an optical display unit which is a multi-colored lighting unit, and wherein the functional module is configured to control the lighting unit on the basis of functional module data relating to the functional module.

18. The functional module as claimed in claim 15, wherein the interaction unit has an actuating element, wherein the actuating element is in the form of a pushbutton, wherein the functional module is configured to disconnect a contact of the connections on the basis of actuation of the pushbutton.

19. A fire alarm and/or extinguishing control center having a central control unit and a plurality of functional modules as claimed in claim 15 which can be connected to the central control unit.

* * * * *